United States Patent [19]

Okazaki

[11] 4,077,862
[45] Mar. 7, 1978

[54] DEVICE FOR REGULATING DRINKING WATER

[75] Inventor: Tatsuo Okazaki, Kamifukuoka, Japan

[73] Assignee: Okazaki Manufacturing Company Limited, Kawagoe, Japan

[21] Appl. No.: 651,839

[22] Filed: Jan. 23, 1976

[51] Int. Cl.² .............................................. C02B 1/82
[52] U.S. Cl. ................................. 204/262; 204/151; 204/263
[58] Field of Search ............... 204/149, 151, 262, 274, 204/236, 239, 241, 301

[56] References Cited

U.S. PATENT DOCUMENTS

| 1,264,535 | 4/1918 | McElroy | 204/262 X |
| 1,539,297 | 5/1925 | Calingaert | 204/262 X |
| 2,882,210 | 4/1959 | Jenks | 204/151 |
| 3,042,593 | 7/1962 | Michlin | 204/274 X |
| 3,378,479 | 4/1968 | Colvin et al. | 204/149 X |
| 3,551,307 | 12/1970 | Gray | 204/241 X |
| 3,835,019 | 9/1974 | Lovelock | 204/274 X |
| 3,847,787 | 11/1974 | Okazaki et al. | 204/151 X |

FOREIGN PATENT DOCUMENTS 508,045  6/1939  United Kingdom ................. 204/262

*Primary Examiner*—Arthur C. Prescott
*Attorney, Agent, or Firm*—Flynn & Frishauf

[57] ABSTRACT

A device for regulating drinking water includes an electrolyzer divided into a negative electrode chamber and a positive electrode chamber by an unglazed partition, and electrodes disposed in the chambers and adapted to be energized by direct current for a prescribed period time for separating water in the electrolyzer into two components having hydroxyl radical in different densities, due to the electrolysis and electroendosmose. The negative electrode has a heating element disposed in a hollow space formed in the negative electrode to warm up the water body in the electrolyzer at each time of the electrolysis.

15 Claims, 12 Drawing Figures

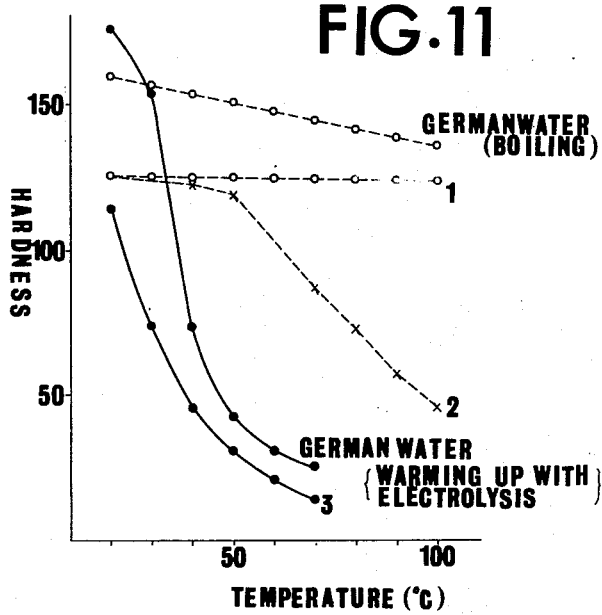
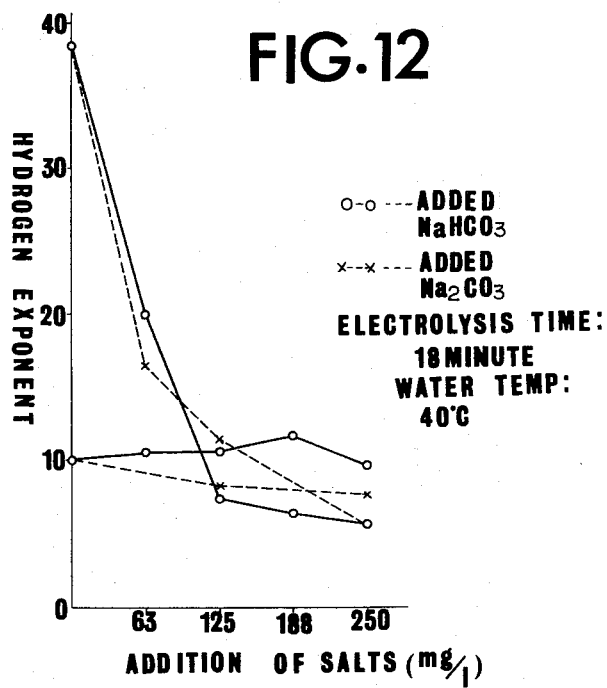

DEVICE FOR REGULATING DRINKING WATER

This invention relates to a device for regulating drinking water, thereby to separate the water to two components having a hydroxyl radical in different densities.

Recently, it has been perceived that drinking water containing abundant cationic particles is useful in promoting health.

This inventor already proposed a device for regulating drinking water including an electrolyzer divided into a negative electrode chamber and a positive electrode chamber by an unglazed partition, and electrodes disposed in the chambers and acting to be energized by direct current for a prescribed time so that the water in the electrolyzer is regulated to be separated into two components having a hydroxyl radical in different densities, due to the electrolysis and electroendosmose.

This device has been improved to regulate drinking water containing an abundance of cationic particles for users without complicated operation, and simultaneously to supply a by-product, i.e., oxiful water which can be used as a beauty lotion or astringent.

An object of this invention is to provide a device improved to regulate drinking water, which contains an abundance of cationic particles and simultaneously is free from mineral salts whether or not the water to be regulated is permanent hard water disolving salts such as chlorates or phosphates which can not be precipitated by boiling.

Another object of this invention is to provide a device improved to maintain drinking water in a clean condition in which bubble floatages generated during the electrolysis are removed from the negative electrode chamber.

A third object of this invention is to provide a device improved to be electrically safe and sanitary.

SUMMARY OF THE INVENTION

According to the present invention, a device for regulating drinking water comprises an electrolyzer which is divided into a negative electrode chamber and a positive electrode chamber by an unglazed portion, positive and negative electrodes disposed in the respective positive and negative electrode chambers and which are adapted to be energized by direct current for a prescribed period of time to separate water in the electrolyzer into two components having a hydroxyl radical in different densities by electrolysis and electroendosmose. The negative electrode positioned in the negative electrode chamber has a hollow space therein and a heating element is disposed in the hollow space of the negative electrode for warming up the water body in the electrolyzer at each time of electrolysis.

BRIEF DESCRIPTION OF THE DRAWINGS

FIG. 11 is a graph showing variation of hardness of water samples as a function of water temperature; and FIG. 12 is a graph showing variation of ion density of water samples as a function of the addition of salt.

DETAILED DESCRIPTION OF THE DRAWINGS

Figure 3:
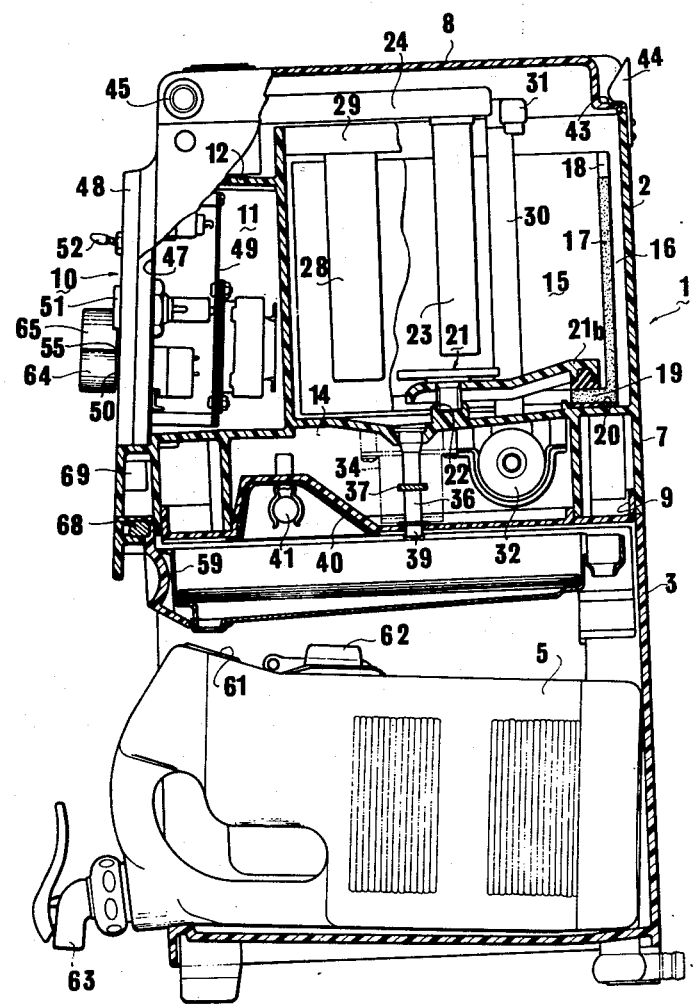
FIG. 3 is a vertical cross-section of the regulating device of FIG. 2.

FIGS. 1 to 9 illustrate a device for regulating drinking water embodying the present invention. The regulating device comprises a water regulating unit 1 having an electrolyzer 2, a base frame 3 formed into a box having two compartments 4 therein and two water preserving tanks 5 and 6. As shown in FIG. 3, the water regulating unit 1 includes an unit body 7, a top cover 8, a bottom cover 9 and a control panel assembly 10. The covers 8 and 9 are removably attached to the top and bottom of the unit body 7 respectively. The unit body 7 further has some compartments integrally formed to the electrolyzer 2. Namely, there are provided a control chamber 11 adjacent to the electrolysis bath 2 and having a front opening which is closed in a water proof manner by the control panel assembly 10 attached to the unit body 7, a stage 12 for receiving an annex tank 13 (FIG. 4) formed on the chamber 11, and a valve setting chamber 14 (FIG. 4) disposed under the electrolysis bath 2 and chamber 11 and having a bottom opening which is closed in a water proof manner by the bottom cover 9 attached to the unit body 7 by setting screw means.

The interior of the electrolyzer 2 is divided into a negative electrode chamber 15 and a positive electrode chamber 16 by an unglazed partition 17. The partition 17 is preferably formed into a hollow cylindrical biscuit having 2 to 3 micron diameter pores. The partition 17 has an overflow port 18 formed in the upper edge thereof by cutting a portion thereof off, and an annular inside flange 19 in this embodiment which is mounted on the bottom of the electrolyzer 2 via a resinous packing seat 20 and fixedly set on the bottom by setting screw means 21. The screw means 21 comprises a resin bolt 21a and a resin trivet 21b having a center bore through which the bolt 21a is disengageably screwed to a blind screw bore 22 formed in the bottom of the electrolyzer 2. The trivet 21b further includes arms for depressing the upper side of the inside flange 19 to the bottom of the electrolyzer 2. Accordingly, the chambers 15 and 16 are separated in a manner to communicate through the unglazed partition 17 only by electroendosmose.

The negative electrode chamber 15 has a negative electrode 23 disposed therein. The negative electrode 23 is made of carbon formed into a hollow cylinder. Alternatively, the negative electrode may be made of titanium and if necessary, the titanium electrode may be plated by a metal of platinum the group. The titanium electrode is easy form into a hollow cylinder and maintains a full strength by itself. The negative electrode 23 hangs from a holder 24, with the top end of the electrode 23 removably attached to the free end of the holder 24. The other end of the holder 24 is pivotally attached to the top of the unit body 7 by setting means in a rigid condition, but is capable of being turned about its pivot when the setting means thereof is released.

Figure 7:
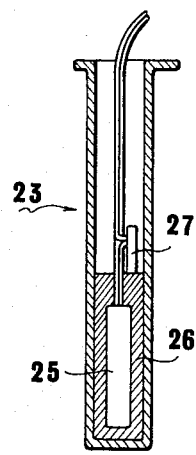
FIG. 7 is a side cross-section of a negative electrode utilized in the regulating device.
Figure 2:
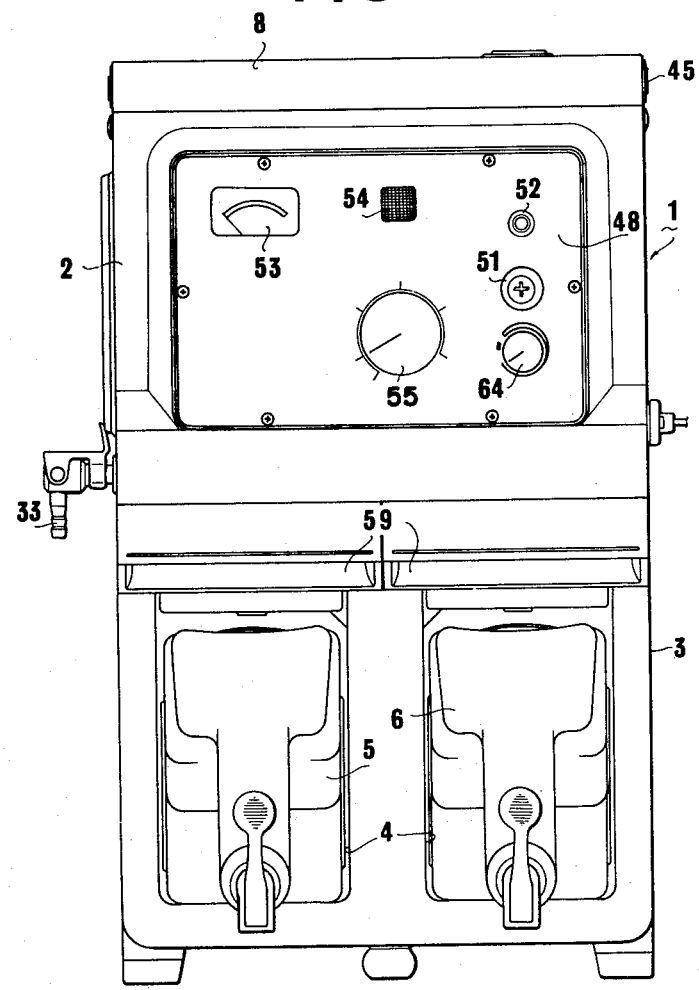
FIG. 2 is a front view of a device for regulating drinking water embodying this invention.

As seen in FIG. 7, in the hollow space formed in the negative electrode 23 is disposed a heating element 25 such as a nickle-chrome wire to be energized by an electrically current. An electric insulating layer 26 is disposed in the hollow space so as to envelop the heating element 25. The hollow space also accomodates a thermo-switch 27 coupled with the heating element 25, so as to avoid the over-heating of the electrode 23.

The positive electrode chamber 16 surrounds the negative electrode chamber 15 and has two or three positive electrodes 28 of carbon disposed therein. The positive electrodes 28 hang from a holder 29 with their upper ends removably attached to the holder 29 which is supported by the upper portion of the unit body 7 in a manner to step over the positive electrode chamber 15.

In this embodiment, the negative or positive electrode may be made of an unglazed member, the surface of which is plated by gold or platinum metal.

The metal is firstly powder coated to the unglazed member to be baked and is glazed to the surface of the unglazed member when the member is well-tempered.

Figure 1:
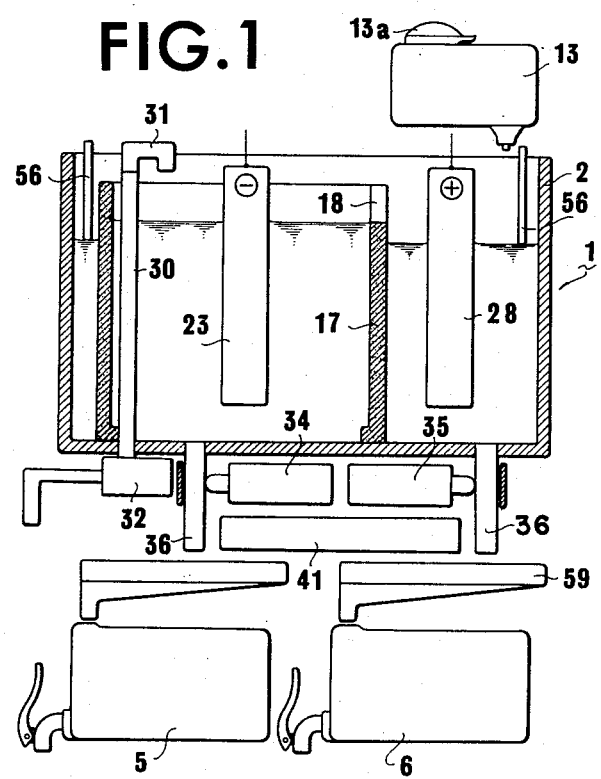
FIG. 1 is a diagramatical illustration of an embodiment of the present invention.

As best seen in FIG. 1, a water supplying tube 30 is vertically mounted from the bottom of the electrolyzer 2 in a manner to extend through and above the negative electrode chamber 15. To the top of the water supplying tube 30 is attached a bent joint 31 of which the opening is directed to the interior of the negative electrode chamber 15. The water supplying tube 30 communicates through a solenoid valve 32 attached to the top portion of the valve setting chamber 14 to a joint plug 33 (FIG. 2) mounted to the side wall of the unit body 7. The plug 33 is connected to a water supply source in use.

Figure 9:
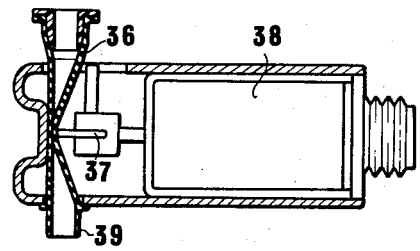
FIG. 9 is a side view of a solenoid valve for use in the regulating device.

The negative and positive electrode chambers 15 and 16 have delivery ports formed in their bottoms respectively. For the delivery ports, solenoid valves 34 and 35 (FIG. 1) are positioned in the valve setting chamber 14 and each has an identical construction. As seen in FIG. 9 and in FIGS. 3 and 4, the solenoid valve arrangement for water-delivery includes an elastic tube 36, a pincher 37 for pinching the tube 36 to shut the water communication, and a solenoid means 38 for operating the pincher 37 when it is energized. The elastic tube 36 of each of the solenoid valves communicates with the delivery port and connected to a short nozzle 39 penetrating the bottom cover 9.

Figure 4:
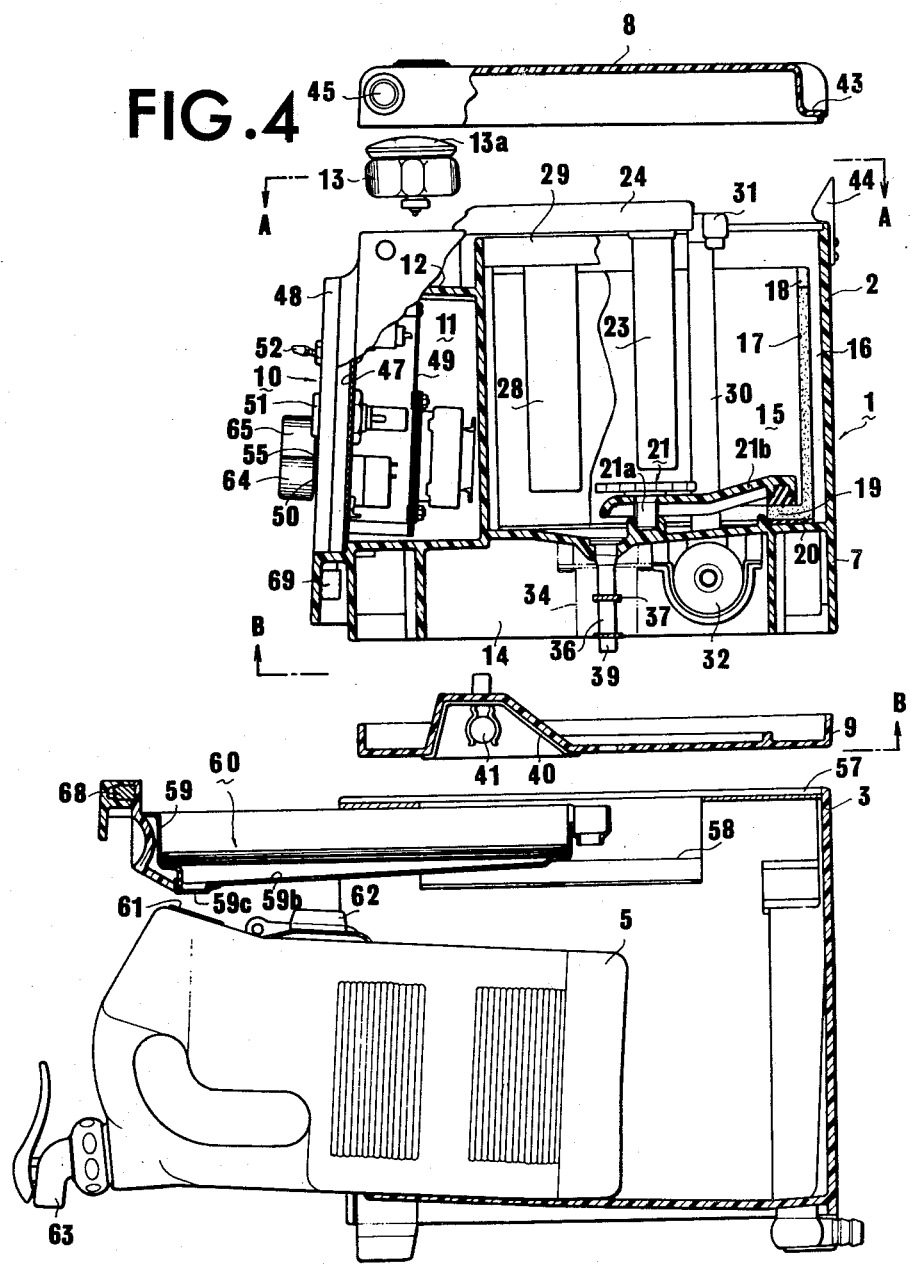
FIG. 4 is a vertical cross-section of the regulating device of FIG. 2 partially demounted.
Figure 5:
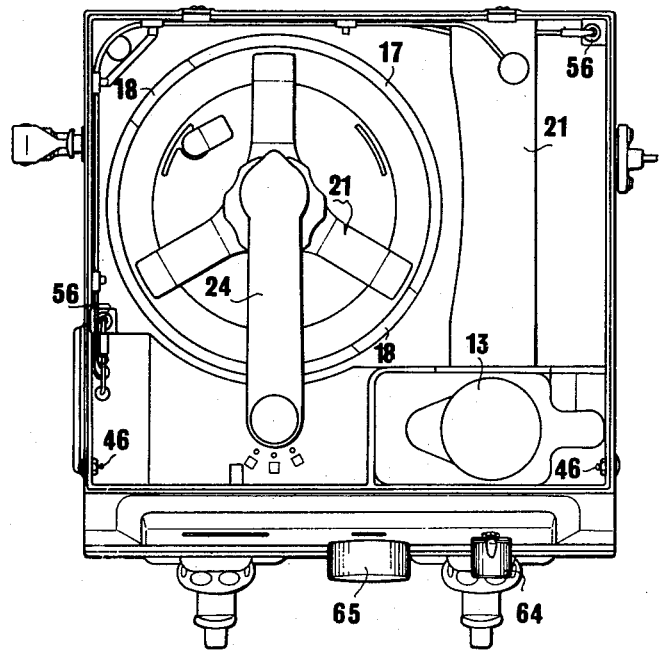
FIG. 5 is a plane view of the regulating device as shown by arrows AA indicated in FIG. 4.
Figure 6:
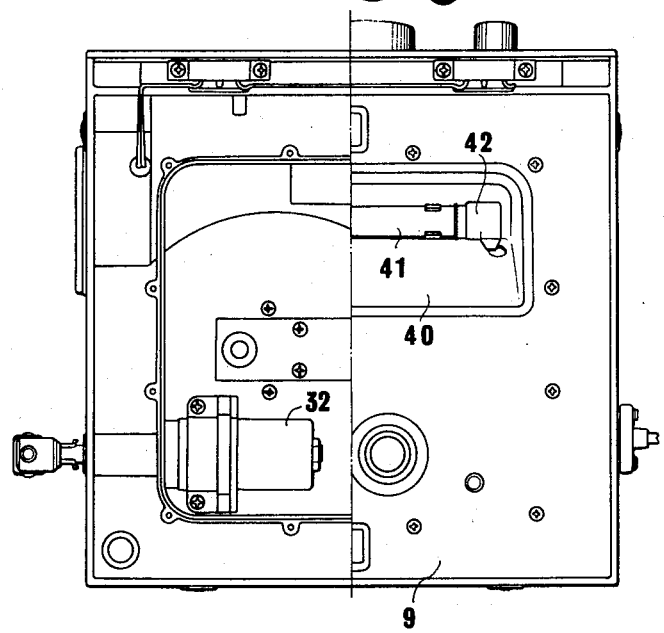
FIG. 6 is a bottom view of the regulating device as shown by arrows BB indicated in FIG. 4.

Referring to FIGS. 3 and 4, the bottom cover 9 has a lower opened recess 40 of which the inner surface is plated by metal so as to be formed as a reflector, and a sterilizing lamp 41, for example, an ultraviolet lamp which is disposed in the recess 40 and supported by receptacles 42 (FIG. 6).

The annex tank 13 (FIG. 4) located on the stage 12 is formed as a squirt type tank having an elastic pusher member 13a so that a water solution of calcium lactate is squirted out by pushing the pusher member 13a into the water in the positive electrode chamber 16. The pusher member 13a projects out through a bore formed in the top cover 8, so that the tank 13 can be operated with the top cover 8 being attached to the unit body 7.

The top cover 8 has two grooves 43 formed to the backside thereof so as to be engaged with hooks 44 of spring steel which are attached to the backside of the unit body 7. The top cover 8 further has two releasing pushers 45 having lock plates (not shown). In accordance with the lock plates, two lock pins 46 (FIG. 5) are mounted on the inner side walls of the unit body 7, so that the lock plates can be engaged with the lock pins 46 in the top cover 8 regularly setting on the unit body 7, while the lock plates can be disengaged from the lock pins 46 when the pushers 45 are pushed.

The control panel assembly 10 includes an indicating panel 47, (FIGS. 3 and 4) a transparent window panel 48 spaced in front of the indicating panel 47 and a supporting frame 49 attached to the backside of the indicating panel 47 and disposed in the control chamber 11.

To the indicating panel 47 are attached to a rotary voltage regulator 50, a fuse holder 51, on-off switch 52, an ammeter 53 for electrolysis, a pilot lamp 54, and a timer 55. The control shafts of the voltage regulator 50 and timer 55 penetrate the transparent window panel 48 to project out of the control panel assembly 10. To the bores of the panel 48 through which the shafts pass should be provided water-seal mechanisms. The other electric elements are attached to the supporting frame 49.

In order to detect the finishing of the water supply, touch-switch elements 56 (FIG. 5) are mounted at to the opposite corners of the positive electrode chamber 16.

The base frame 3 includes an upper stage 57 (FIG. 4) to which the water regulating unit 1 is removably attached, and racks 58 disposed under the upper stage 57.

Two trays 59 are set on the racks 58 and filter assemblies 60 are laid on the bottoms of the trays 59, so that the water from the chambers 15 and 16 through the valves 34 and 35 respectively fall down to the trays and after the percolation are put in the tanks.

Figure 8:
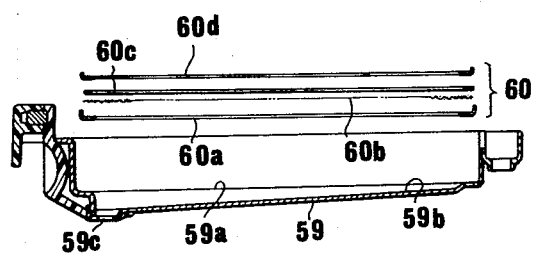
FIG. 8 is a side cross-section of a tray and a filter assembly for use in the regulating device.

As best seen in FIG. 8, the tray 59 has an inner flange 59a for supporting the peripheral edge of the filter assembly 60, an inclined bottom 59b and a pouring port 59c.

The filter assembly 60 comprises a rectangle core 60a having a shallow inside flange, a basic net 60b of stainless steel wire stretched on the core 60a with its edge welded to the core flange, a filter element 60c, for example, a felt mat superposed on the net 60b, and a supporting core 60d tightly inserted into the core 60a to depress the side edges of the filter element 60c to the net 60b.

As seen in FIGS. 3 and 4, each of the tanks 5 and 6 has an inlet port 61 with a cap 62 which is positioned under the pouring port 59c when the tank is regularly set in the compartment 4. The tank further includes a cock valve 63 used with the tank being set in the compartment 4.

In this embodiment, reference numbers 64 and 65 are knobs attached to the outer ends of the regulator shaft and timer shaft respectively.

Figure 10:
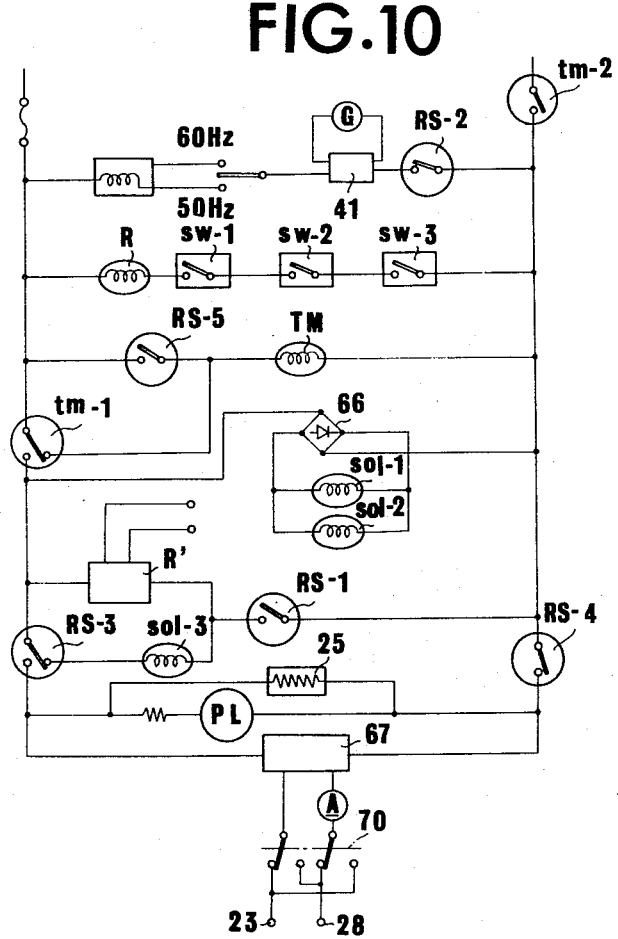
FIG. 10 is an electric circuit for the regulating device embodying this invention.

In operation, the knob 64 is adjusted to obtain a voltage between the electrodes 23 and 28 matching the water quality, and the knob 65 is operated to cause timer switches tm-1 and tm-2 to be closed and to thereby energize solenoid coils sol-1 and sol-2 of the solenoid means 38 through a diode rectifier 66 and a relay R (see FIG. 10).

By energizing the solenoid coils sol-1 and sol-2, the pinchers 37 pinch the tube 36 to shut the water passage.

By energizing the relay R, relay switches RS-1 and RS-2 are closed to energize the sterilizing lamp 41, and to energize the solenoid coil sol-3 of the valve 32 to thereby operate the valve 32 to opened position, and simultaneously the touch switch elements 56 are set in a detecting position. After the negative electrode chamber 15 is filled, the water passes through the overflow port 18, and is introduced into the positive electrode chamber 16. When the water flows over the partition 17, floatage, such as dust, contained in the supplied water is carried from the negative electrode chamber to the positive electrode chamber.

The touch switch elements 56 detect the finishing of the water supply as the positive electrode chamber fills up with water to a prescribed level, and relay R' is energized so that relay switches RS-3, RS-4 and RS-5 are switched to cause the direct current to be supplied to the electrodes 23 and 28 for electrolysis. Simultaneously, the circuit for a timer motor TM is closed. When the relay switch RS-3 is switched, the solenoid coil sol-3 is de-energized to stop the water supply at the time, or before, the electrolysis is started. Also, the pilot lamp PL is energized. In this case, alternating current is changed to direct current by means of a rectifier 67. Simultaneously, the heating element 25 is energized to warm up the water bodies in the chambers 15 and 16 during the electrolysis and electroendosmose.

The effect of heating of water together with such electrooperations may better be understood from test results indicated in FIGS. 11 and 12. Namely, the permanent hard water, which is a sample of Japanese well water, can not be precipitated only by boiling as shown by a dash line (1) in FIG. 11. In order to soften the permanent hard water, it has been well known to add carbonates to the water. However, this method is carried out on the condition that the water should be boiled above 100° centigrade with carbonates added thereto so that the water barely has 50 hardness, as shown by a dash line (2) in FIG. 11. While, the method for heating water at the time of electrolysis according to this invention results in fully softening water at about 35° centigrade by adding carbonates (250 mg/l, 18 minute for electrolysis) as shown by a solid line (3) in FIG. 11. Provided the water originally contains carbonates or bicarbonates such as a German water taken as a sample in this test, it is not necessary to add additional.

The Japanese well water and German water mentioned above have respective characteristics as follows.

|  | Japanese Water | German Water | Japanese Water (adding NaHCO$_3$) |
|---|---|---|---|
| Hydrogen exponent (pH) | 6.36 | 7.82 | 7.22 |
| Hardness | 125 | 160 | 125 |
| BCP Alkali exponent | 0.49 meq/l | 2.56 | 3.46 |
| Electrolysis Alkali side (pH) | 10.1 | 9.8 | 9.8 |
| Acid side (pH) | 3.1 | 6.2 | 6.0 |
| Hardness of Alkali water | 136 | 74 | 65 |

Since the Japanese well water has a small BCP Alkali exponent as compared with the German water so as to maintain carbonic ions slightly as electrolysis, the water in the negative electrode chamber (in the alkali side) has a large hardness and the water in the positive electrode chamber (in the acid side) has a low hydrogen exponent. Such water is generally called permanent hard water.

In contradistinction, the German water has a large BCP Alkali exponent as electrolysis, the water in the negative electrode chamber has a small hardness and the water in the positive electrode chamber approximately maintains the same hydrogen exponent as that before electrolysis. Such water is generally called a temporarily hard water.

When the Japanese water has carbonates added thereto during the electrolysis, the water in the negative electrode chamber has a small hardness and the water in the positive electrode chamber approximately maintains the same hydrogen exponent as that before electrolysis. Such a phenomenon is explainable as follows.

Namely, the water in the negative electrode chamber obtains ions such as $Ca^{++}$, $Mg^{++}$ and $OH^-$ increased during electrolysis. If the water fully maintains carbonic ions, it is assumed that the ions are precipitated as insolvent carbonates as follows.

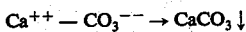

$$Ca^{++} - CO_3^{--} \rightarrow CaCO_3 \downarrow$$

The the water in the positive electrode chamber obtains ions such as $Cl^-$, $SO_4^{--}$, $HCO^-$ and $H^+$ increased during electrolysis. If the water fully maintains carbonic ions, it is assumed that the hydrogen ions are expendible by processing the reaction from the leftside to the rightside as follows.

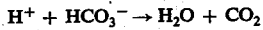

$$H^+ + HCO_3^- \rightarrow H_2O + CO_2$$

Consequently, this invention has an advantage inducing to soften the hard water with ease by warming up the water during the electrolysis. In this case, the water may be warmed before the electrolysis.

When the electrolysis, the time of which is decided by the timer setting, is completed, first the timer switch tm-1 is switched to be opened so that the electrolysis ceases, and the solenoid coils sol-1 and sol-2 are de-energized. Accordingly, the valve 32 is closed and the valves 34 and 35 are opened to, thereby permit water to fall down to the trays 59.

The water is sterilizd by the beam of the ultra-violet lamp 41 in flowing in the trays 59 and percolating with the filter asseembly 60.

The touch-switches 56 are released due to the lowering of the water level in the electrolyzer so that relay switches RS-3, RS-4 and RS-5 are switched in return.

After all the water has poured from the ports 59c through the inlet ports 61 into the tanks 5 and 6, the timer 55 supplies an electric signal to the timer switch tm-2 to cause it to be switched. Then, the timer motor TM is stopped, the ultra-violet lamp 41 and relay R are de-energized and the relay switches RS-1 and RS-2 are opened.

In this embodiment, the sterilizing lamp 41 can be energized during the time the electrodes have voltage applied thereto, so that the interiors of the trays 59 are clarified or sterilized before receipt of the water.

If the water is a low conductivity water, the voltage is regulated basically by varying the distance between the negative and positive electrodes 23 and 28 by adjusting the holder 24 by turning.

In order to avoid malfunctioning when the water regulating unit 1 is disengaged from the base frame 3, or the top cover 8 or one of the trays 59 is removed from the set place or is set in only halfway, there are provided safty switch means in the water regulating unit 1. Each of the safty switch means includes a magnet 68 which is embedded in the upper portion of the base frame 3 (the under portion of top cover 8 and the handle portion of the tray 59) and a reed switch 69 which is attached to the suitable portion of the unit body 7 in correspondence to the embedded portion. Such switches 69 are indicated in FIG. 10 as reference characters sw-1, sw-2 and sw-3.

When the unit body 7 is regularly set on the base frame 3, the top cover 8 on the unit body 7 and the trays 59 on the racks, the reed switches 69 are closed under the magnetic field caused by the magnet 68.

In this embodiment, change-over switches 70 are positioned between the electrodes and rectifier 67 and manually operatable so that the negative electrode 23 passes the direct current in the reverse direction to thereby cause the adhesion to be stripped off from the surface thereof.

What is claimed is:

1. A device for softening and increasing the pH of drinking water comprising:
   an electrolyzer vessel for receiving water therein;
   an unglazed partition member dividing said vessel into a negative electrode chamber and a positive electrode chamber;
   positive and negative electrodes disposed in the respective positive and negative electrode chambers and adapted to be energized by direct current for a prescribed period of time to separate water in the electrolyzer into two components having a hydroxyl radical in different densities by electrolysis and electroendosmose;
   the negative electrode positioned in the negative electrode chamber having a hollow space therein;
   a heating element disposed in said hollow space of said negative electrode for warming up the water body in the electrolyzer at each time of the electrolysis to improve the softening of the water; and
   a thermo-switch in said hollow space of said negative electrode, said thermo-switch being coupled to said heating element to cut off the voltage supply to said heating element at a predetermined temperature to avoid overheating of said negative electrode.

2. A device for softening and increasing the pH of drinking water according to claim 1 in which said negative electrode has an insulating layer in its hollow space to envelop the heating element, and including means for supplying to the heating element an electric current having a high voltage different from that supplied to the electrodes for energizing the heating element.

3. A device for regulating drinking water according to claim 1 wherein said negative electrode disposed in said negative electrode chamber is made of titanium forced into a hollow cylinder, with its hollow space being waterproof.

4. A device for regulating drinking water according to claim 3 wherein said titanium electrode has an outer surface plated by a metal of the platinum group.

5. A device for regulating drinking water according to claim 1 comprising means for adjustably positioning at least one of said negative and positive electrodes in its respective electrode chamber to change the distance between said negative and positive electrodes.

6. A device for regulating drinking water according to claim 5 wherein said adjustable positioning means includes a holder supporting said at least one electrode, said holder being turnable at an angle to change said distance.

7. A device for regulating drinking water according to claim 1 wherein said partition has an overflow port formed at the upper edge thereof so that bubble floatages generated during the electrolysis are carried from the negative electrode chamber to the positive electrode chamber through said overflow port.

8. A device for regulating drinking water according to claim 1 including a water supply source only directed to said negative electrode chamber, so that the water is supplied from the negative electrode chamber to the positive electrode chamber by means of the water overflowing the upper edge of said partition.

9. A device for regulating drinking water according to claim 1 further comprising a water regulating unit including an electric control system mounted in a waterproof area adjacent to the electrolyzer, a base frame having two compartments therein and an upper stage to which the water regulating unit is removably attached, and two water tanks removably received in respective ones of said compartments and adapted to receive the treated water therein.

10. A device for regulating drinking water according to claim 9 wherein said base frame includes racks disposed under the upper stage, trays are set on the racks, and filter elements laid on the bottoms of the trays, so that the water from said chambers respectively fall down the trays and after percolation through the filter elements flows to said tanks.

11. A device for regulating drinking water according to claim 9 including a sterilizing lamp coupled to a current supply and attached to a holder disposed under a reflector located at the bottom of the water regulating unit, for producing a sterilizing beam directed to the water flowing in the trays.

12. A device for regulating drinking water according to claim 9 further comprising a safety switch means coupled to the water regulating unit and to said electrodes for switching off the direct current supply for the electrodes when the water regulating unit is disengaged from the base frame.

13. A device for regulating drinking water according to claim 9 further comprising a safety switch means coupled to the water regulating unit and to said electrodes for switching off the direct current supply for the electrodes when at least one of said trays is at least partially removed from its respective compartment.

14. A device for regulating drinking water according to claim 11 further comprising a safety switch means coupled to the water regulating unit and to said sterilizing lamp for switching off the current supply for the sterilizing lamp when the water regulating unit is disengaged from the base frame.

15. A device for regulating drinking water according to claim 11 further comprising a safety switch means coupled to the water regulating unit and to said sterilizing lamp for switching off the current supply for the sterilizing lamp when at least one of said trays is at least partially removed from its respective compartment.

* * * * *